R. D. BROWN.
WAGON BRAKE.
No. 26,472. Patented Dec. 20, 1859.
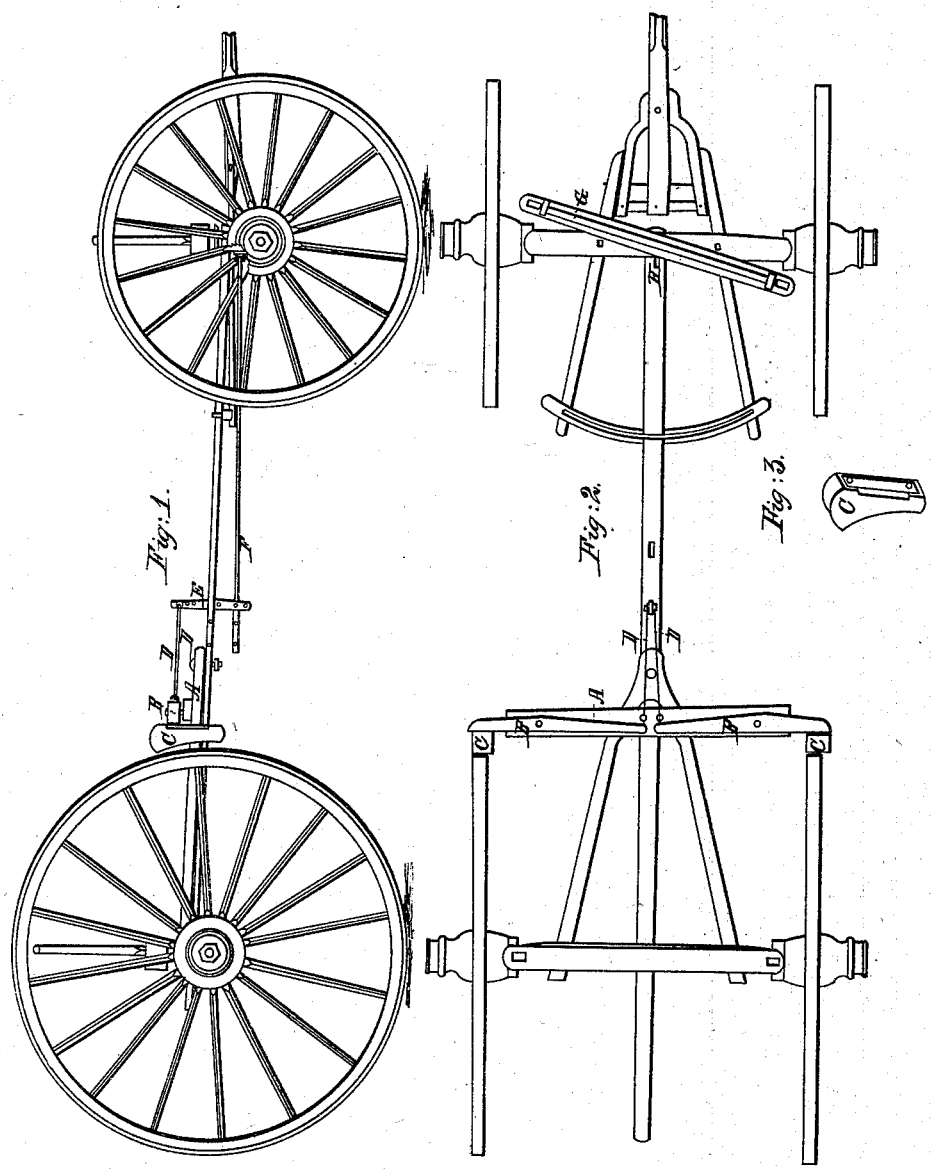
Witnesses:
Inventor:
Robert D Brown

UNITED STATES PATENT OFFICE.

ROBT. D. BROWN, OF PRATTSBURG, NEW YORK.

WAGON-BRAKE.

Specification of Letters Patent No. 26,472, dated December 20, 1859.

*To all whom it may concern:*

Be it known that I, ROBERT D. BROWN, of Prattsburg, in the county of Steuben and State of New York, have invented a new and Improved Wagon-Brake; and I do hereby declare that the following is a full, clear, and exact description of the construction and operation of the same, reference being had to the annexed drawings making a part of this specification in which—

Figure 1, is a side view of the wagon. Fig. 2, is a birdseye view of the same. Fig. 3, is a perspective view of brake block.

The letters of reference refer to the same parts in each figure.

A, is a wooden bar laid across and fastened to the hind axle braces or crotchet; its use is to hold the levers B and B.

B and B, are levers pivoted to the bar A; the length is from the center of the bar A to the outside of the wheels; at the hind edges and in front of the wheels is a notch made to receive the irons of the rubbers and allow them to move freely up or down, this notch is overlaid with a plate of iron that holds the rubbers in place; at the inner end of each lever is a connecting rod connected with a turning joint.

C and C, are the rubbers, they are made wider at the upper end and curved at the edge next to the wheel, on the other edge is a notch longer than the thickness of the levers B so as to allow the rubbers to raise when the wheel is turned backward, each rubber has a plate of iron near the length of the rubber or long enough to cover the notch and allow the same to be bolted to the block. Before the plate is bolted to the block it is put in the notch of the levers B. By this means the rubber is held in position against the wheels when required, or allowed to raise when the wheel is turned backward.

D and D, are connecting rods that connects the levers B and B to the lever E by a bolt or pivot.

E, is a lever pivoted to the coupling bar; it has a series of holes to allow of adjustment to suit the force required, at the lower end or beneath the coupling bar is pivoted the rod F.

F, is a connecting rod; the hind end has a series of holes to pivot it to the lever E to suit the length of coupling bar required, the forward end is pivoted to the hind side of the forward axle as shown in Fig. 1, where a part of the nave is removed to allow the same to be seen.

G, is a roller fitted into the forward bolster into the upper surface so that it may be turned either way and keep its position, its use is to prevent friction of the box moving ahead as when going down hill, or moving backward when going uphill.

H, is an elongated hole in the coupling bar at the forward end of the bar through which the kingbolt passes; the length of the hole is made to suit the motion required to give sufficient force to the brake blocks or rubbers; the hole is elongated to allow the hind part of the wagon to approach nearer to the forward part when the forward part is slightly held when going down hill, thereby actuating the levers and causing the rubbers to be pressed against the outer surface or tire of the hind wheels.

What I claim as my invention and desire to secure by Letters Patent is—

The combination and arrangement of the brake mechanism, lever E and connecting rod F, when the latter is attached directly to the front axle so as to be operated by the backward movement of the front truck; the said movement being allowed by the slot H, in the reach or coupling bar and the roller G in the bolster, substantially as herein set forth.

ROBERT D. BROWN.

Witnesses:
 WM. COMSTOCK,
 CHARLES KETCHUM.